United States Patent [19]

Farrar et al.

[11] Patent Number: 4,653,905

[45] Date of Patent: Mar. 31, 1987

[54] FIBER OPTIC RANGE FINDER SYSTEMS

[75] Inventors: Reed A. Farrar, Tustin; Aaron D. Gara, Irvine, both of Calif.

[73] Assignee: Newport Corporation, Fountain Valley, Calif.

[21] Appl. No.: 768,106

[22] Filed: Aug. 21, 1985

[51] Int. Cl.⁴ .......................... G01C 3/08; G03B 3/00
[52] U.S. Cl. .......................................... 356/4; 354/403
[58] Field of Search ........................ 356/4; 250/227; 354/403

[56] References Cited

U.S. PATENT DOCUMENTS

| | | | |
|---|---|---|---|
| 3,327,584 | 6/1967 | Kissinger | 250/227 |
| 4,249,076 | 2/1981 | Bergstrom et al. | 250/227 |
| 4,358,960 | 11/1982 | Porter | 250/227 |
| 4,379,225 | 4/1983 | Apothaker | 250/227 |

Primary Examiner—Russell E. Adams
Attorney, Agent, or Firm—Benoit Law Corporation

[57] ABSTRACT

One or more optical fibers are provided with different numerical apertures for differently transmitting light from an object. Light is thus transmitted for a given range at a predetermined ratio corresponding to a difference between the different numerical apertures. That ratio is varied by variations in the range. The varying ratio is detected and a range finder operation is performed in response to that detected varying ratio.

24 Claims, 10 Drawing Figures

FIBER OPTIC RANGE FINDER SYSTEMS

BACKGROUND OF THE INVENTION

1. Field of the Invention

The subject invention relates to fiber optics and range finders in a broad sense and, more specifically, to such range finders employing fiber optics or optical fibers.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Previous fiber optics range sensors have been sensitive to factors that can cause significant range errors, such as surface texture, tilt and reflectivity variations of the test object.

In this respect, U.S. Pat. No. 3,327,584, by C. D. Kissinger, issued June 27, 1976, for a Fiber Optic Proximity Probe, discloses a light level system. U.S. Pat. No. 4,249,076, by J. Bergstrom et al, issued Feb. 3, 1981, for an Optical Measuring Device Using Optical Fibers, tried to stabilize the drawback of light level systems. Similarly, U.S. Pat. No. 4,358,960, by J. H. Porter, issued Nov. 16, 1982, for a Differential Fiber Optic Proximity Sensor, proposed the use of a pair of output light guides arranged with their light receiving ends at different distances from the test object so that intensities of reflected light received and transmitted by such guides provide for a null indication at a predetermined distance from the test object and will vary differentially as a function of distance variation.

SUMMARY OF THE INVENTION

It is a general object of this invention to overcome the disadvantages and to meet the needs expressed or implicit in the above Information Disclosure Statement or in other parts hereof.

It is a related object of this invention to improve range finder operations with fiber optic means.

It is a germane object of this invention to improve the insensitivity of fiber optical range finders to surface texture, tilt and reflectivity variation of test objects.

Other objects of the invention will become apparent in the further course of this disclosure.

From a first aspect thereof, the subject invention resides in a method of providing a range finder operation wherein fiber optic means transmit light from an object. The invention according to this aspect resides, more specifically, in the improvement comprising in combination the steps of providing the fiber optic means with different numerical apertures for differently transmitting light from the object through the fiber optic means, transmitting the light from the object with the fiber optic means for a given range at a predetermined ratio corresponding to a difference between the different numerical apertures, varying the ratio by variations in that range, detecting the varying ratio, and performing a range finder operation in response to the detected varying ratio.

From a related aspect thereof, the subject invention resides in a range finder and, more specifically, in the improvement comprising, in combination, fiber optic means having different numerical apertures for transmitting light from an object for a given range from that object at a predetermined ratio corresponding to a difference between the different numerical apertures and for varying the ratio by variations in that range, means coupled to said fiber optic means for detecting the varying ratio, and means connected to the detecting means for performing a range finder operation in response to the detected varying ratio.

Other aspects of the invention will become apparent in the further course of this disclosure, and no restriction to any aspect, object or feature is intended by this Summary of the Invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
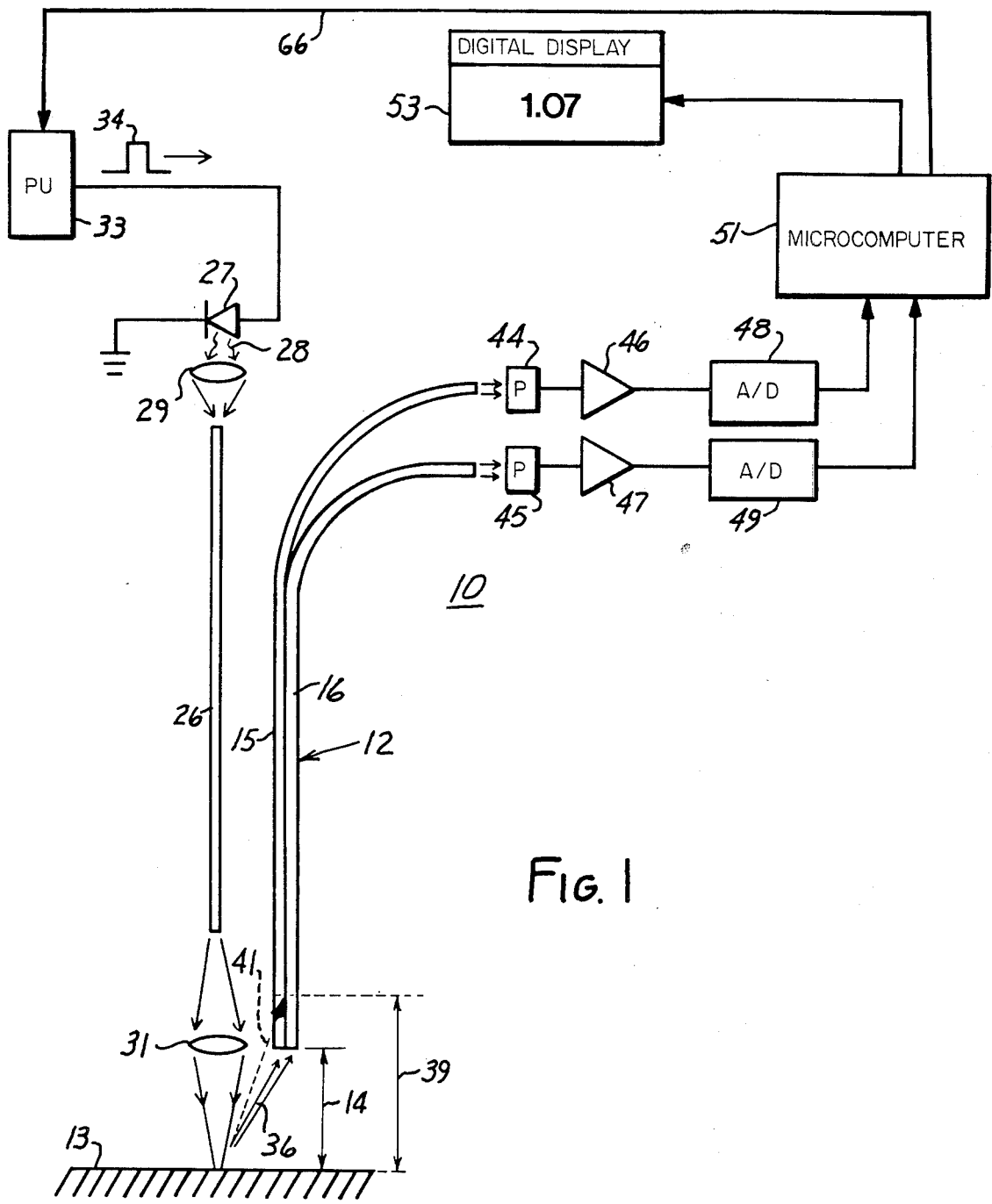
FIG. 1 is a somewhat diagrammatic showing of a range finder according to a preferred embodiment of the invention.

The range finder or proximity sensor 10 according to illustrated preferred embodiments of the subject invention includes fiber optic means 12 having different numerical apertures for transmitting light from an object 13 for a given range 14 from that object at a predetermined ratio corresponding to a difference between the different numerical apertures, and for varying that ratio by variations of the range 14. According to a further preferred embodiment of the subject invention, the fiber optic means include one or more first optical fibers 15 having a first numerical aperture, and one or more second optical fibers 16 having a different second numerical aperture.

In fiber optics, numerical aperture, N.A., may be defined as follows:

$$N.A. = N_o \sin u = \sqrt{N_1^2 - N_2^2} \quad (1)$$

wherein:
- $N_0$ = Index of refraction of air;
- $N_1$ = Fiber core index of refraction;
- $N_2$ = Fiber cladding index of refraction; and
- u = Angle of exiting light cone.

These parameters are well known in fiber optics, where optical fibers have a core and a cladding extending around and along the core and having an index of refraction different from the index of refraction of the core. For present purposes, the angle, u, of the light cone exiting an optical fiber is measured relative to a longitudinal axis through that fiber.

In practice, the numerical aperture may be predetermined for an optical fiber by appropriate selection or provision of the index of refraction of the fiber core and/or the index of refraction of the fiber cladding.

Figure 3:
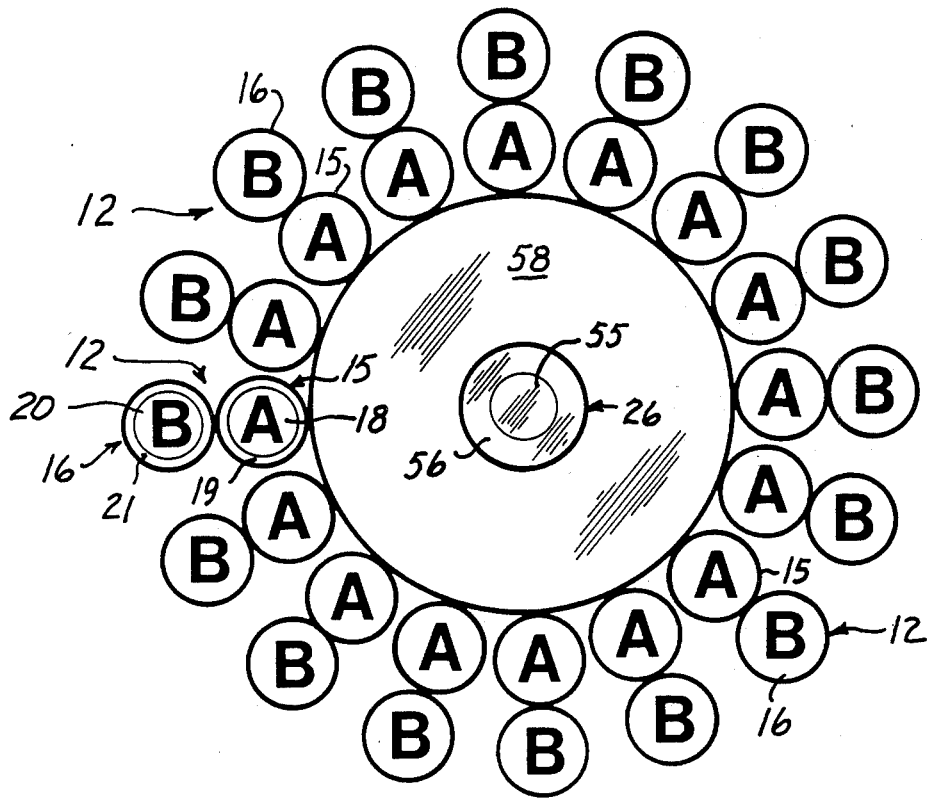
FIG. 3 is a distal view of a multiple pair optical fiber probe according to a further embodiment of the invention.

For the purpose of illustration, FIG. 3 shows a core 18 and cladding 19 for one of the fibers 15 and a core 20 and cladding 21 for the other of the fibers 16. The relative core and cladding diameters are, of course, not drawn to scale in FIG. 3.

Figure 2:
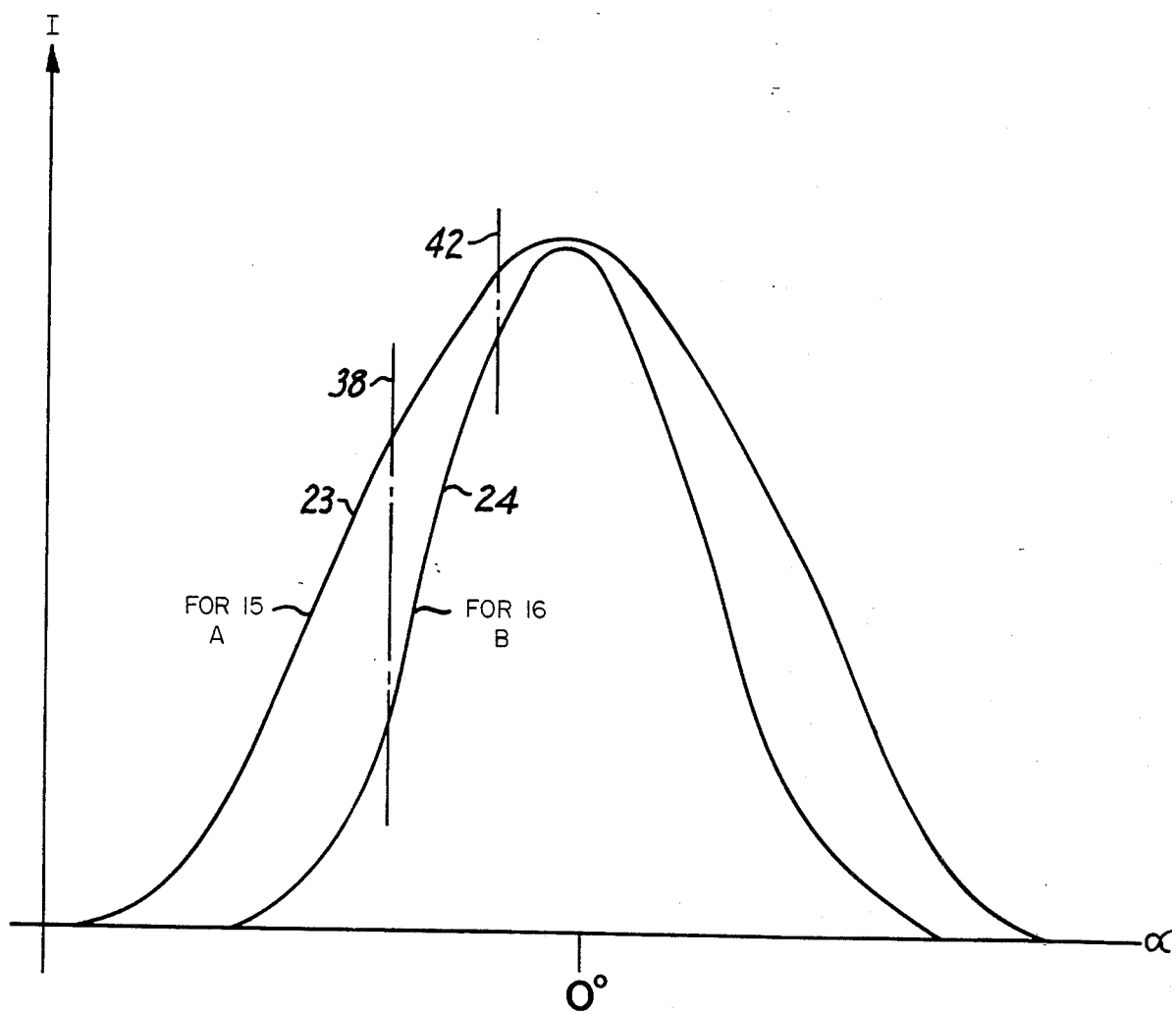
FIG. 2 is a light intensity versus angular relationship plot illustrating numerical aperture relationships in optical fibers employed in the illustrated preferred embodiments.

Curves 23 and 24 in FIG. 2 graphically illustrate numerical aperture relationships for the fibers 15 and 16. In particular, FIG. 2 is a plot of light intensity, I, or normalized optical power, versus an angle α relative to a center line or longitudinal axis through each fiber.

The plot shown in FIG. 2 was obtained by moving a point source of light along an arc in front of the end of each fiber 15 and 16. In each case, the particular fiber intercepted a portion of the light from the point source and transmitted that light to a photodetector, the signal of which was amplified, digitized and plotted as a function of the angle α, which in this case was the angle of the position of the point source of light relative to a center line of 0°. This also is standard procedure in fiber optics.

However, the point apparent from FIG. 2 is that the fibers 15 and 16 have different numerical apertures, as seen from the different curves 23 and 24.

Fibers 15 and 16 may be termed light receiving fiber, while a further fiber 26 may be called a light transmitting fiber.

In particular, as shown in some of the drawings, a light source 27 emits light 28 through a lens 29 to the light transmitting fiber. That fiber 26, in turn, transmits the light to a lens 31 which projects that light onto the object 13.

In practice, the light source 27 may, for instance, be a light emitting diode (LED) energized by a pulsing unit 33. A conventional electric power source may be employed at 33 for providing the light source 27 with electric energizing pulses. In practice, effects of stray light and similar disturbances may be avoided by a modulated or pulsed light source.

The light transmitted from the source 27 is reflected by the object 13 as diagrammatically shown at 36. In practice, the light 36 may emanate from the object itself, such as when the object 13 is itself a light source or otherwise emits light.

In either case, the fiber optic means 12 or first and second optical fibers 15 and 16 transmit the light 36 from the object 13 for a given range 14 at a predetermined ratio corresponding to a difference between the different numerical apertures labeled, respectively, A and B in FIG. 3.

By way of example, a phantom line 38 in FIG. 2 dissects the characteristic curves 23 and 24 to illustrate a ratio of light transmission by the fibers 15 and 16 for a given angle of incidence of the reflected light 36 on the fiber input faces.

Illustrated preferred embodiments of the subject invention, including the one shown in FIG. 1, vary that ratio by variations in the range 14. For instance, if the range is varied by increasing the distance between the receive fiber input faces and the object 13 to a distance 39, then light transmitted or reflected by the object 13 inpinges on the fiber input faces at a different angle, as, for instance, illustrated in FIG. 1 by the dotted arrow 41 for light reflected or transmitted by the object 13. The same is, of course, true when the object 13 moves away from or toward the receive fiber input faces.

A second phantom line 42 in FIG. 2 illustrates a second ratio of light transmission by the fibers 15 and 16, corresponding to the second distance 39 relative to the object 13.

As may readily be seen from FIG. 2, the ratio of light transmission is varied along the curves 23 and 24 between the values shown at 38 and 42 by variations in the range between 14 and 39, for instance.

It is a particular advantage of the subject invention that, as long as the fibers 15 and 16 sample a small optical field, the ratio of light transmission will remain constant for a given object distance or light incidence, even though the optical field intensity as a whole may vary. As range is varied, the ratio of light transmitted through fibers 15 and 16 changes in a manner that is determined by the different numerical apertures A and B of these fibers. Surface texture, tilt and reflectivity variations of the object 13 do not affect the ranging operation with the range finders according to the subject invention.

The illustrated preferred embodiments of the invention further detect the varying ratios of transmitted light and perform a range finder operation in response to such detected varying ratios. By way of example, FIG. 1 shows a first photodetector 44 associated with the first fiber 15, and a second photodetector 45 associated with the fiber 16. In this respect, the first optical fiber 15 has a first numerical aperture, and the second optical fiber has a different second numerical aperture, and the light 36 or 41 is transmitted from the object 13 with the first and second optical fibers for a given range 14 at a predetermined ratio corresponding to a difference between the first and second numerical apertures A and B. The latter ratio is varied by variations in the range, such as shown at 39, for detection and performance of the range finder operation.

The photodetectors 44 and 45, respectively, detect light transmitted through the fibers 15 and 16, and apply electric signals corresponding to detected light intensity to amplifiers 46 and 47, respectively.

The amplified light detector output signals are applied via analog-to-digital converters 48 and 49 to a microcomputer 51. In principle, a differential amplifier or comparator or similar circuitry may be used instead, but available microcomputers are now generally considered to be more convenient for handling the outputs of the photodetectors 44 and 45 and providing a digital display.

The amplified and converted output signals of the photodetectors 44 and 45 are mathematically combined by the microcomputer 51 to provide a digital display in inches, millimeters or other units of length or range, or in any fractions thereof.

The digital display is shown at 53, and each drawing figure displays a different combination of digits to indicate a given range or distance measured at the object 13.

While the accompanying drawings are somewhat schematic to show principal and essential structure, it should be understood that elaborate mounts and supporting structures may be employed for the illustrated fiber optics components as, for instance, shown in the above mentioned patents, which are herewith incorporated by reference herein.

Where the fiber optic means include first and second optical fibers 15 and 16 provided at the object 13 with first and second light entrance faces, respectively, such entrance faces are preferably illuminated with essentially equal intensities of light 36 or 41 from the object 13, so that the fibers 15 and 16 sample essentially the same optical field for increased accuracy and freedom from disturbing factors, as already mentioned above.

In the embodiment of FIG. 3, as well as in other illustrated embodiments, the light 28 is first transmitted to the object 13 with the aid of a third optical fiber 26 and is reflected by the object to entrance faces of first and second optical fibers. As in the other particularly illustrated embodiments, the light transmitting fiber 26 is an optical fiber having a core 55 and a cladding 56 of different refractive indices.

In the preferred embodiment shown in FIG. 3, the light transmitting optical fiber 26 is surrounded by pairs of receive fibers. In particular, the third optical fiber 26 is surrounded by the first and second optical fibers 15 and 16 arranged in pairs 12. As shown in FIG. 3, each first fiber 15 has a numerical aperture A different from the numerical aperture B of each second fiber 16. The multiple pairs of receive fibers 12 are arranged in a symmetrical pattern around the central transmit fiber 26 in the embodiment shown in FIG. 3. The space 58 between the central fiber 26 and the receive fibers 12 may be provided or filled with an optically inert mounting material; that is, with a material that will maintain the external fiber pairs 12 supported and spaced from the central fiber 26. No particular structure is shown for this purpose, since it would unnecessarily burden the otherwise clear illustration with secondary details that are well known from various fields, such as cable manufacture in general and fiber optics in particular. Also, reference may again be had to the above mentioned patents which are incorporated by reference herein and show various mounting structures and secondary details for optical probes and range finders.

In practice, each fiber pair 12 may have its own pair of photodetectors 44 and 45, amplifiers 46 and 47 and analog-to-digital converters 48 and 49 for its fibers 15 and 16, respectively. In that case, it is not essential that each pair 12 sample the same optical field amplitude as every other fiber pair of the multiple set. However, if a common detector is employed, the transmission efficiency of all first fibers 15 and the transmission efficiency of all second fibers 16 has to be the same for the same light output at the common detector.

The digitized outputs of each photodetector pair 44 and 45 may again be applied to a differential amplifier or comparator represented in FIG. 1 by a microcomputer 51. However, given the state of the art of microelectronics, it will generally be more convenient to use a microcomputer for developing the input signal for the display 53 from the output signals of photodetectors 44 and 45 of some or all of the optical fiber pairs 12. In this respect, while a single fiber pair would be operative and within the scope of the subject invention, the multiple fiber pairs of FIG. 3 are preferred for a more versatile operation and a further reduction of signal-to-noise ratio and other disturbing influences.

Thickness measurements may be effected by putting a range sensor on each side of an object, such as in the manner disclosed in the above mentioned incorporated Porter U.S. Pat. No. 4,358,960.

According to further embodiments of the subject invention, the receive or fiber optic means may have an optical fiber which is provided alternatively with different first and second numerical apertures, A and B, for instance. Light is then transmitted from the object 13 with that optical fiber for a given range at a predetermined ratio corresponding to a difference between the first and second numerical apertures, and the latter ratio is varied by variations in the range for detection and performance of the range finder operation. This, then, is an aspect of the subject invention in which a single fiber would function as a pair of fibers having different numerical apertures A and B. One advantage of that further aspect of the invention is that the single fiber assures sampling of the same optical field for both numerical apertures more absolutely than a pair of fibers 15 and 16 of finite sizes.

That further aspect of the invention can be implemented in various ways, some of which are illustrated in the following drawings.

Figure 4:
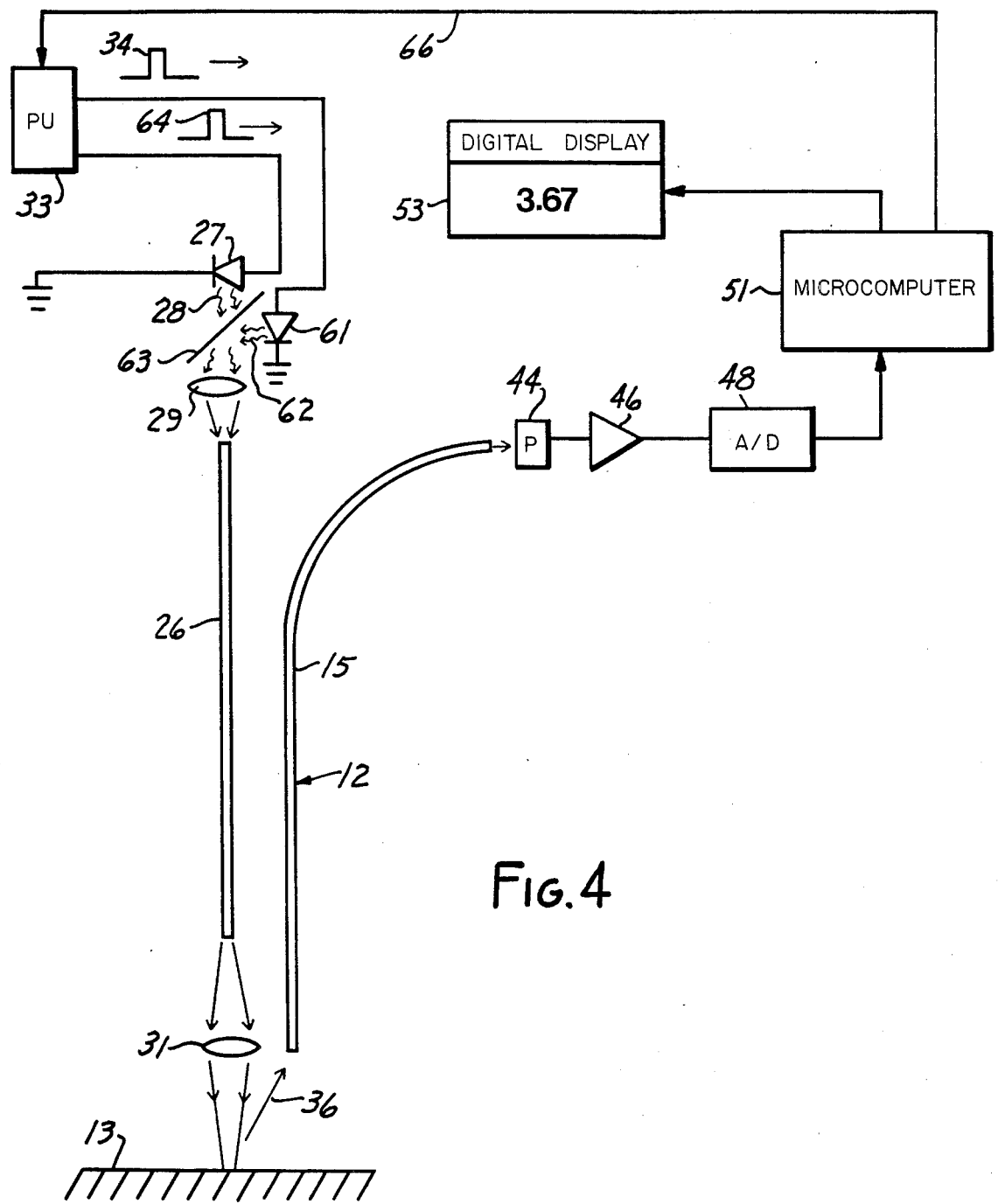
FIG. 4 illustrates a range finder according to a further embodiment of the subject invention.

By way of example, FIG. 4 shows an embodiment in which the or each fiber optic receive means 12 has a single receive fiber 15 for transmitting reflected light from the object 13 to the single photodetector 44. The optical fiber 15 has a wavelength-dependent numerical aperture, as well known as such in fiber optics.

In the embodiments of both FIGS. 1 and 4, the light emitting diode or source 27 preferably emits light 28 of a narrow wavelength. However, according to FIG. 4, a second light emitting diode or source 61 is employed for emitting light 62 of a different second wavelength to a beam splitter 63 for alternatively applying the light outputs 28 and 62 to the transmit fiber 26 and hence to the object 13. As indicated by pulses 34 and 64, the power supply or pulsing unit 33 energizes or pulses the light sources 27 and 61 alternatively so that light outputs of different wavelengths are alternatively transmitted by the fiber 26 to the object 13, for reflection as indicated at 36 to the input face of the receive fiber 15.

Since the fiber 15 is wavelength-dependent as mentioned above, the alternating light outputs 28 and 62 of different wavelengths provide the receive fiber alternatingly with different first and second numerical apertures, such as the different apertures A and B discussed above. This, in turn, provides response characteristics of the type illustrated in FIG. 2, whereby the microcomputer 51 is enabled to provide an output signal driving the digital display 53 for an indication of the object distance or range.

As indicated by a line 66 in FIG. 4, the pulsing unit 33 may be controlled by the microcomputer, whereby light from the overall source represented by light emitting diodes 27 and 61 is varied in wavelength. This, in turn, varies the light 36 emanating from or reflected by the object 13 in wavelength as well.

The light 36 is thus transmitted at its different wavelengths from the object 13 with the optical fiber 15 for a given range at the predetermined ratio corresponding to a difference between the first and second numerical apertures engendered by the different wavelengths. As before, the latter ratio is varied by variations in the range relative to the object 13 for performance of the range finder operation.

In terms of FIG. 4, it may also be said that the light at different wavelengths is transmitted from the object 13 with the optical fiber for a given range at a predetermined ratio corresponding to a difference between the first and second numerical apertures A and B.

Figure 5:
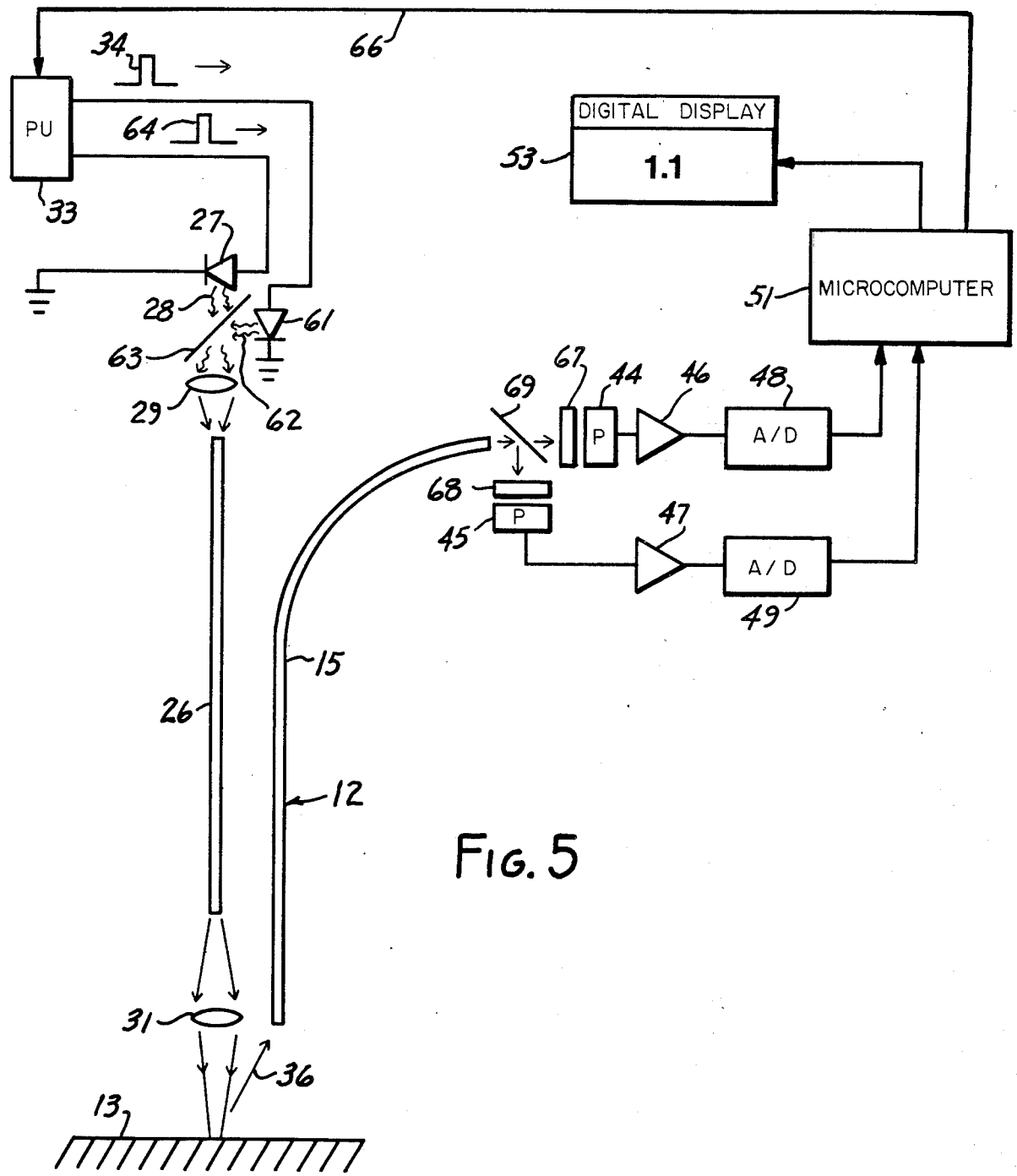
FIG. 5 illustrates a range finder according to a further embodiment of the subject invention.

According to FIG. 5, photodetectors 44 and 45 are equipped with different narrowband optical input filters 67 and 68, respectively. The different transmission bands of these optical filters 67 and 68 correspond to the different wavelengths of the light source outputs 28 and 62. A beamsplitter 69 directs light transmitted by the receive fiber 15 to the photodetectors 44 and 45 via filters 67 and 68, respectively.

In practice, the different wavelengths are selected to be reflected at the same efficiency by the surface of the object 13.

The remainder of the system of FIG. 5 may operate the same as the embodiment of FIG. 1, in that the microcomputer 51 receives the different amplified and digitized photosensor output signals for generation of a digital display at 53 indicating distance or range relative to the object 13.

Figure 6:
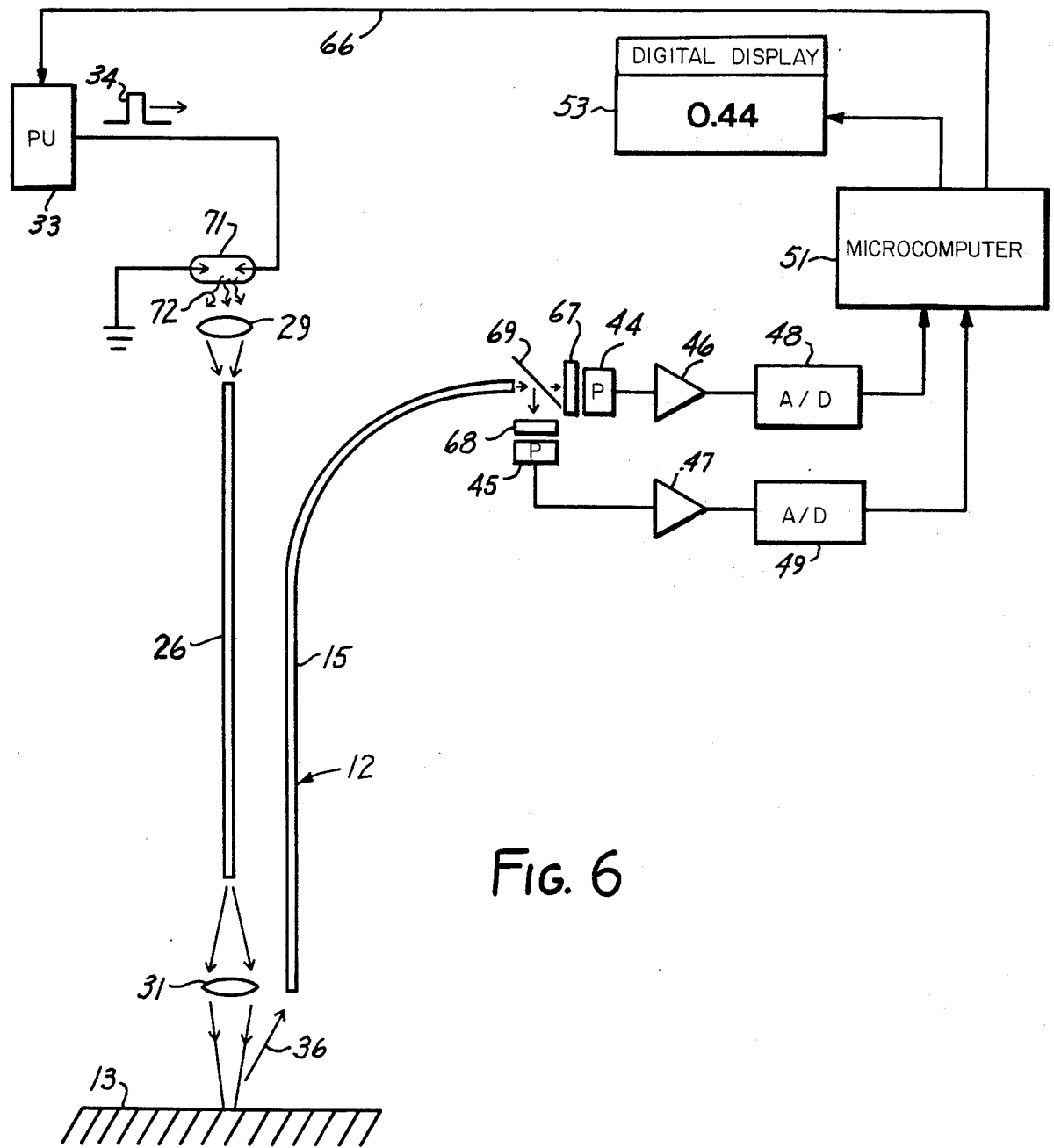
FIG. 6 illustrates a range finder according to a further embodiment of the subject invention.

While the light emitting diodes 27 and 61 have sometimes been considered herein as a single light source, they, indeed, could be replaced by one light source, suchas in the manner shown in FIG. 6, if uniform spectral reflection is assumed. In particular, the embodiment illustrated in FIG. 6 employs a broadband light source 71 for illuminating the object 13 via lens 29, transmit fiber 26 and lens 31.

By way of example, a xenon flash tube, pulsed by the power supply 33, may be employed at 71. However, the embodiment of FIG. 6 is not limited to any particular light source, as long as the light output 72 of the source is broad enough to cover the transmission bands of filters 68 and 67.

The different wavelengths contained in the broadband light 72 in effect provide the receive optical fiber 15 with different first and second numerical apertures, as discerned by photodetectors 44 and 45 through their input filters 67 and 68, respectively. The remainder of the system of FIG. 6 then operates the same as the corresponding parts of the systems of FIG. 1 in general and FIG. 5 in particular.

Figure 7:
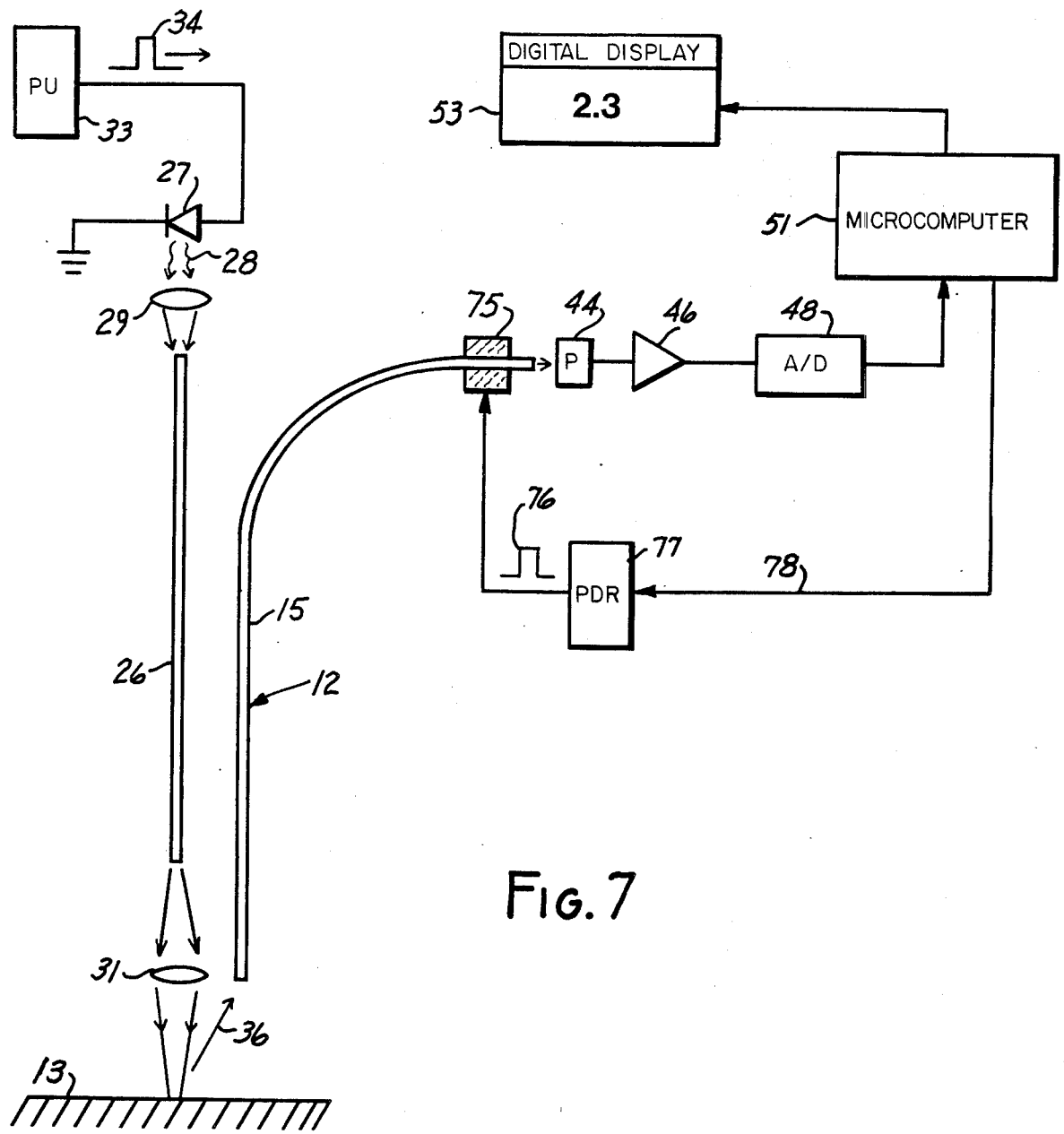
FIG. 7 illustrates a range finder according to a further embodiment of the subject invention.

In the embodiment of FIG. 7, the receive fiber 15 extends through a piezoelectric device 75 for selectively pinching the fiber.

In this respect, it is known that pinching or mechanical compression of optical fibers changes the numerical aperture or optical mode thereof. Piezoelectric effects have been known for a long time, as have piezoelectric materials, including nickel and familiar piezoelectric ceramics, for instance. Accordingly, if a piezoelectric device contacts the fiber, it can easily be made to contract and pinch that fiber in response to an electric energizing pulse 76.

In the embodiment shown in FIG. 7, the energizing pulse 76 may be provided by a conventional piezoelectric driver 77 which, in turn, may be controlled by the microcomputer 51 via a line 78.

The illustrated embodiment of FIG. 7 thus provides the fiber optic means 12 with a mechanically compressible optical fiber 15 having alternating optical modes in response to successive compression and relaxation of the optical fiber, and employs the piezoelectric pinching device 75 for alternatively compressing and relaxing the optical fiber to provide that optical fiber 15 with a response corresponding to that of alternating different first and second numerical apertures A and B. Light 36 from the object 13 is transmitted through the alternatively compressed and relaxed predetermined ratio of light transmission corresponding to a difference between the first and second numerical apertures A and B. The latter ratio is again varied in response to variations in the range of the object for detection and performance of the range finder operation, such as with the aid of photodetector 44 and microcomputer 51, which distinguishes between the compressed and relaxed modes induced by the microcomputer via line 78. Again, a digital display may be provided at 53 of all determined ranges.

Figure 8:
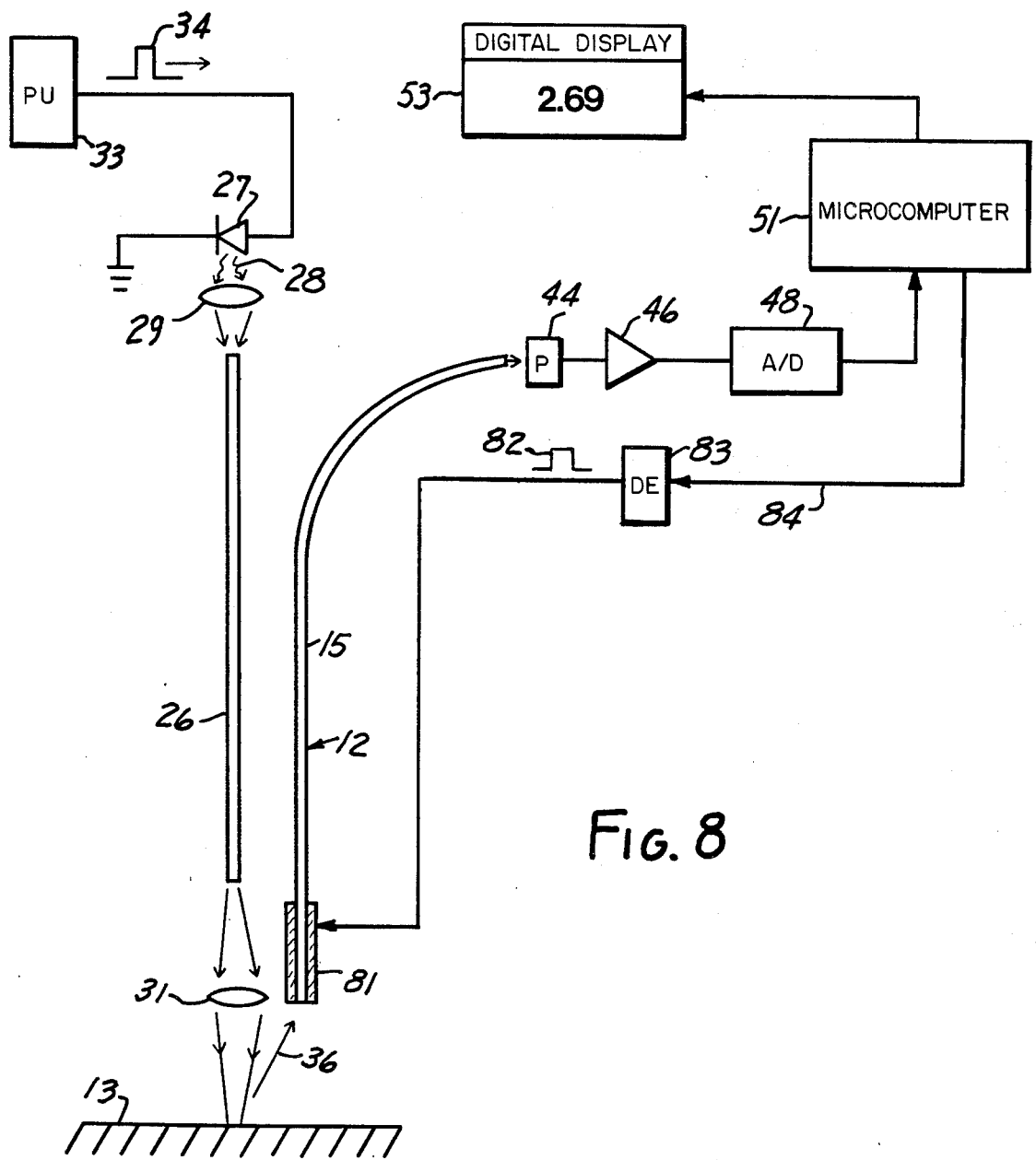
FIG. 8 illustrates a range finder according to a further embodiment of the subject invention.

The same applies to the embodiment of FIG. 8, except that that embodiment provides the fiber optic means 12 with an optical fiber 15 having a core and a cladding either of which has a variable refractive index. In this respect, the well-known presence of core 18 and cladding 19 in an optical fiber has already been explained with respect to FIG. 3. In the embodiment of FIG. 8, however, an electrooptic device 81 is provided for changing a refractive index of the optical fiber in response to an electric pulse 82 supplied by driver electronics 83 which may either be part of the microcomputer 71 or may be controlled thereby, as indicated by a line 84. Electrooptic devices usable at 81 include Kerr or Faraday cells, their PLZT or other solid-state counterparts, acoustooptic and magnetooptic devices, for example. It may thus be noted that the expression "electrooptic" is used herein in a broad sense for electrically energizable devices that will change refractive index upon pulsing. Where a birefringent operation is involved, as in the case of electrooptic cells or solid-state devices, light polarization and analysis may be employed as well known in those areas.

In the embodiment of FIG. 8, the electrooptic device 81 changes the refractive index of the cladding in response to pulses 82. The device 81 thus varies the refractive index to provide the optical fiber 15 with a response corresponding to that of alternating different first and second numerical apertures A and B in response to energizing pulses 82 alternating with valleys between such pulses.

In other words, the refractive index of, say, the cladding of the optical fiber 15 is periodically varied between different first and second values.

Light 36 from the object 13 is transmitted through the optical fiber 15 while varying its refractive index to provide for a given range a predetermined ratio of light transmission corresponding to a difference between the first and second numerical apertures. Again, the latter ratio is varied by variations in the range at the object 13 for detection and performance of the desired range finder operation, such as with the aid of the microcomputer 51 and digital display 53.

Figure 9:
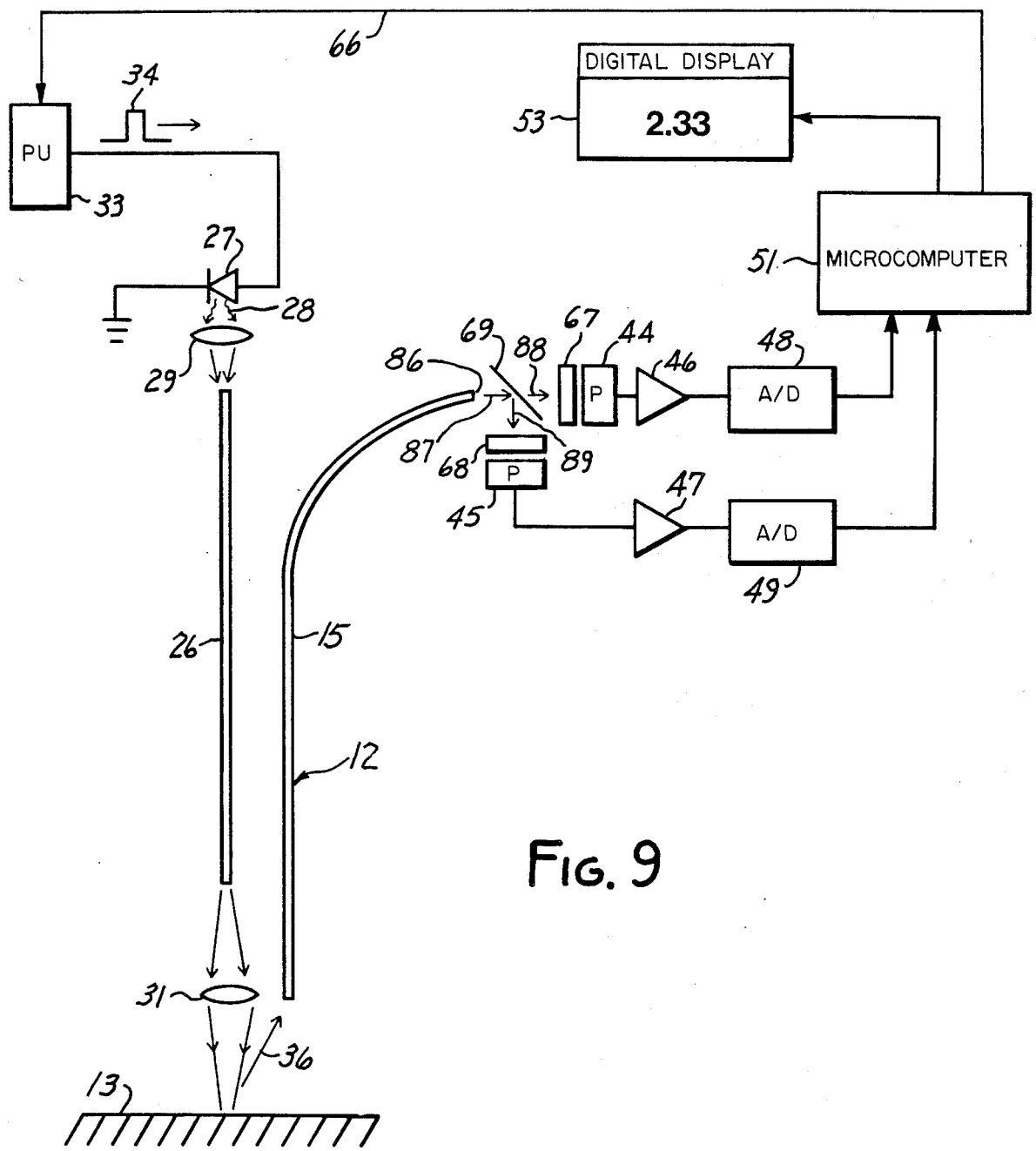
FIG. 9 illustrates a range finder according to a further embodiment of the subject invention.

In the embodiment illustrated in FIG. 9, the fiber optic means 12 include an optical fiber 15 having a light output end 86 and operating at high order modes and low order modes, and at least one optical filter 67 for attenuating in light 87 transmitted by the optical fiber predetermined order modes more than the other ones of the order modes. For instance, high order modes may be attenuated more than low order modes, or low order modes may be attenuated more than high order modes, as desired.

The fiber optic means 12 include at the light output end 86 a first light path 88 including the filter 67 for attenuating the predetermined order modes, and a second light path 89 excluding the filter 67, for providing the fiber optic means 12 in the optical fiber 15 and first and second light paths 88 and 89 with a response corresponding to that of alternating different first and second numerical apertures, respectively.

The fiber optic means 12 include beam dividing means 69 at the light output end 86 for providing the first and second light paths 88 and 89.

Light 36 is transmitted from the object 13 through the optical fiber 15 and through the first and second light paths 88 and 89 to provide for a given range a predetermined ratio of light transmission corresponding to a difference between the above mentioned first and second numerical apertures. Again, the latter ratio is varied by variations in the range at the object 13 for detection and performance of the ranger finder operation essentially as described above.

In principle, a mode attenuating filter need only be provided in one of the light paths 88 and 89. However, the embodiment illustrated in FIG. 9 shows for the first and second light paths 88 and 89 different filters 67 and 68 for attenuating predetermined order modes differently. For instance, the filter 67 may attenuate the low order mode in the path 88, while the filter 68 attenuates the high order mode in the path 89.

Figure 10:
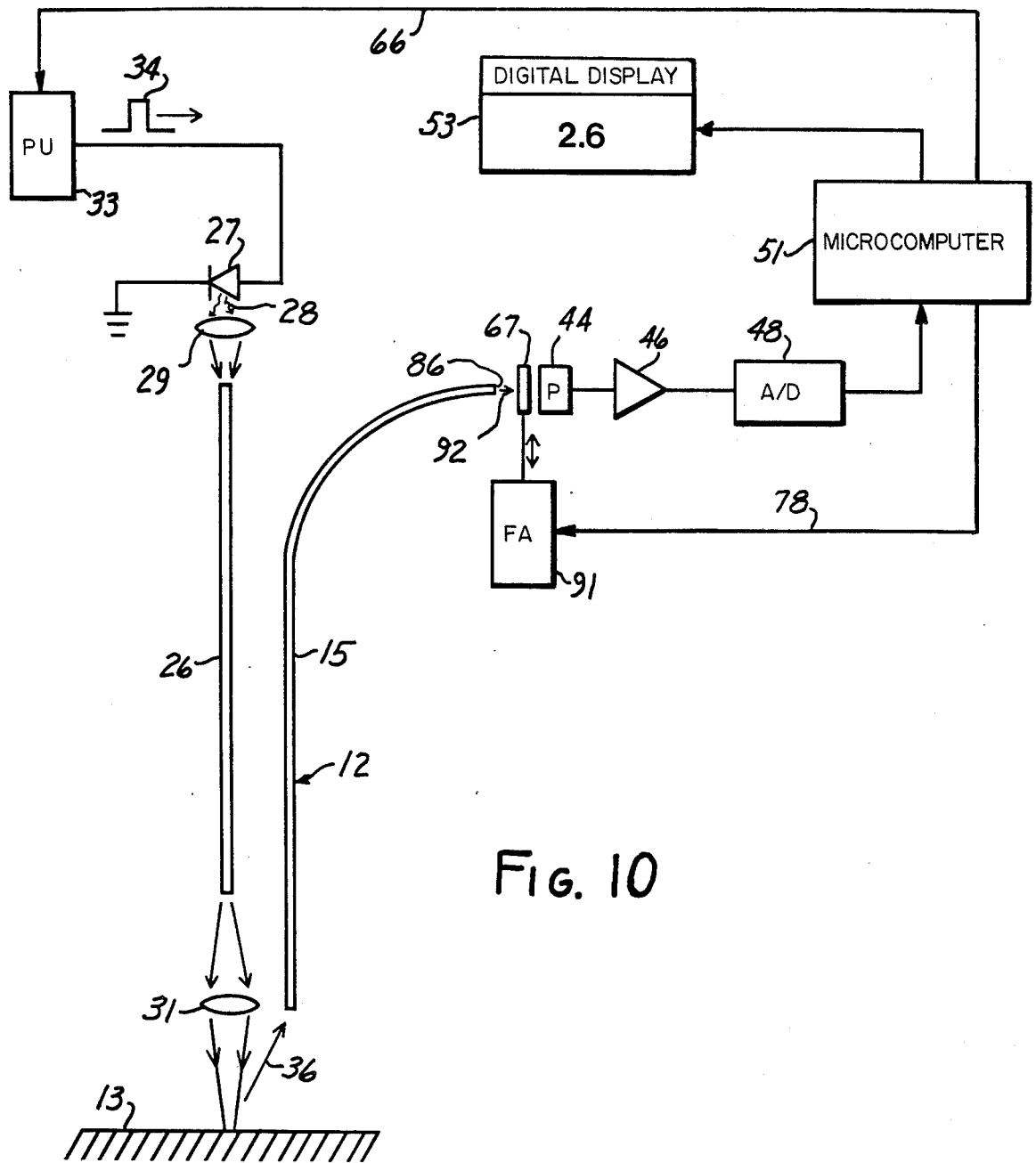
FIG. 10 illustrates a range finder according to a further embodiment of the subject invention.

The embodiment shown in FIG. 10 also includes the optical filter 67 for attenuating predetermined order modes more than other order modes. The fiber optic means 12 now include an actuater 91 for moving that optical filter 67 at the light output end 86 of the optical fiber 15 intermittently in and alternatively out of a path 92 of light from the object 13 transmitted by the optical fiber 15, to provide the fiber optic means 12 with a response corresponding to that of alternating different first and second numerical apertures A and B.

The embodiment of FIG. 10 thus transmits the light 36 from the object through the optical fiber 15 and intermittently through the optical filter 67 in addition to the optical fiber, to provide for a given range a predetermined ratio of light transmission corresponding to a difference between the above mentioned first and second numerical apertures.

In practice, the filter actuator 91 may be of an electromechanical or piezoelectric type, and may be controlled by the microcomputer 51, as indicated by the line 78.

Again, the latter ratio is varied by variations in the range at the object 13 for detection and performance of the range finder operation, such as in the manner described in connection with the other disclosed embodiments of the invention.

The subject extensive disclosure will render apparent or suggest to those skilled in the art various modifications and variations within the spirit and scope of the invention and equivalents thereof.

We claim:

1. In a method of providing a range finder operation wherein fiber optic means transmit light from an object, the improvement comprising in combination the steps of:
   providing said fiber optic means with different numerical apertures for differently transmitting light from the object through the fiber optic means;
   transmitting said light from the object with said fiber optic means for a given range at a predeterxined ratio corresponding to a difference between said different numerical apertures;
   varying said ratio by variations in said range;
   detecting said varying ratio; and
   performing a range finder operation in response to said detected varying ratio.

2. A method as claimed in claim 1, wherein:
   said fiber optic means are provided with a first optical fiber having a first numerical aperture, and with a second optical fiber having a different second numerical aperture;
   said light is transmitted from the object with said first and second optical fibers for a given range at a predetermined ratio corresponding to a difference between said first and second numerical apertures; and
   the latter ratio is varied by variations in said range for detection and performance of said range finder operation.

3. A method as claimed in claim 2, including the steps of:
   providing said first and second optical fibers at said object with first and second light entrance faces, respectively; and
   illuminating said entrance faces with essentially equal intensities of light from said object.

4. A method as claimed in claim 1, wherein:
   said fiber optic means are provided with first optical fibers having a first numerical aperture, and with second optical fibers having a different second numerical aperture;
   said light is first transmitted to said object with the aid of a third optical fiber and is reflected by the object to entrance faces of said first and second optical fibers;
   said reflected light is transmitted from the object with said first and second optical fibers for a given range at a predetermined ratio corresponding to a difference between said first and second numerical apertures; and
   the latter ratio is varied by variations in said range for detection and performance of said range finder operation.

5. A method as claimed in claim 4, wherein:
   said third optical fiber is surrounded by said first and second optical fibers arranged in pairs.

6. A method as claimed in claim 1, including the steps of:
   providing said fiber optic means with an optical fiber;
   providing said optical fiber alternatively with different first and second numerical apertures;
   transmitting said light from the object with said optical fiber for a given range at a predetermined ratio corresponding to a difference between said first and second numerical apertures; and
   varying the latter ratio by variations in said range for detection and performance of said range finder operation.

7. A method as claimed in claim 1, including the steps of:

providing said fiber optic means with an optical fiber having a wavelength-dependent numerical aperture;

providing said light transmitted from said object with different wavelengths to provide said optical fiber with different first and second numerical apertures;

transmitting said light at said different wavelengths from the object with said optical fiber for a given range at a predetermined ratio corresponding to a difference between said first and second numerical apertures; and varying the latter ratio by variations in said range for detection and performance of said range finder operation.

8. A method as claimed in claim 1, including the steps of:

providing said fiber optic means with an optical fiber having a wavelength-dependent numerical aperture;

varying light from said object in wavelength to provide said optical fiber alternatively with different first and second numerical apertures;

transmitting said light at said varying wavelength successively from the object with said optical fiber for a given range at a predetermined ratio corresponding to a difference between said first and second numerical apertures; and varying the latter ratio in response to variations in said range for detection and performance of said range finder operation.

9. A method as claimed in claim 1, including the steps of:

providing said fiber optic means with a mechanically compressible optical fiber having alternating optical modes in response to successive compression and relaxation of the optical fiber;

alternatively compressing and relaxing said optical fiber to provide said optical fiber with a response corresponding to that of alternating different first and second numerical apertures;

transmitting said light from the object through said alternatively compressed and relaxed optical fiber to provide for a given range a predetermined ratio of light transmission corresponding to a difference between said first and second numerical apertures; and varying the latter ratio in response to variations in said range for detection and performance of said range finder operation.

10. A method as claimed in claim 1, including the steps of:

providing said fiber optic means with an optical fiber having a light output end and operating at high order modes and low order modes and with an optical filter for attenuating in light transmitted by said optical fiber predetermined order modes more than the other ones of said order modes;

providing at said light output end a first light path including said filter for attenuating said predetermined order modes and providing at said light output end a second light path excluding said filter for providing said fibers optic means in said optical fiber and first and second light path with a response corresponding to that of alternating different first and second numerical apertures, respectively;

transmitting said light from the object through said optical fiber and through said first and second light paths to provide for a given range a predetermined ratio of light transmission corresponding to a difference between the latter first and second numerical apertures; and varying the latter ratio by variations in said range for detection and performance of said range finder operation.

11. A method as claimed in claim 1, including the steps of:

providing said fiber optic means with an optical fiber having a light output end and operating at high order modes and low order modes and with an optical filter for light transmitted by said optical fiber attenuating predetermined order modes more than the other ones of said order modes;

moving said optical filter at said light output end intermittently in and alternatively out of a path of light from said object transmitted by said optic means to provide said optic means with a response corresponding to that of alternating different first and second numerical apertures;

transmitting said light from the object through said optical fiber and intermittently through said optical filter in addition to said optical fiber to provide for a given range a predetermined ratio of light transmission corresponding to a difference between the latter first and second numerical apertures; and varying the latter ratio by variations in said range for detection and performance of said range finder operation.

12. A method as claimed in claim 1, including the steps of:

providing said fiber optic means with an optical fiber having a core and a cladding either of which has a variable refractive index;

varying said refractive index to provide said optical fiber with a response corresponding to that of alternating different first and second numerical apertures;

transmitting said light from the object through said optical fiber while varying said refractive index to provide for a given range a predetermined ratio of light transmission corresponding to a difference between said first and second numerical apertures; and varying the latter ratio by variations in said range for detection and performance of said range finder operation.

13. In a range finder, the improvement comprising in combination:

fiber optic means having different numerical apertures for transmitting light from an object for a given range from said object at a predetermined ratio corresponding to a difference between said different numerical apertures and for varying said ratio by variations in said range;

means coupled to said fiber optic means for detecting said varying ratio; and means connected to said detecting means for performing a range finder operation in response to said detected varying ratio.

14. A range finder as claimed in claim 13. wherein:

said fiber optic means include a first optical fiber having a first numerical aperture and a second optical fiber having a different second numerical aperture for transmitting light from the object for a given range at a predetermined ratio corresponding to a difference between said first and second numerical apertures.

15. A range finder as claimed in claim 13, wherein:
said fiber optic means include first optical fibers having a first numerical aperture, and second optical fibers having a different second numerical aperture;
said range finder has means including a third optical fiber for transmitting light to said object for reflection by the object to entrance faces of said first and second optical fibers and transmission of said reflected light from the object with said first and second optical fibers for a given range at a predetermined ration corresponding to a difference between said first and second numerical apertures, and variation of the latter ratio by variations in said range for detection and performance of said range finder operation.

16. A range finder as claimed in claim 15, wherein:
said third optical fiber is surrounded by said first and second optical fibers arranged in pairs.

17. A range finder as claimed in claim 13, wherein:
said fiber optic means include an optical fiber having alternatively different first and second numerical apertures, for transmitting said light from the object for a given range at a predetermined ratio corresponding to a difference between said first and second numerical apertures, and variation of the latter ratio by variations in said range for detection and performance of said range finder operation.

18. A range finder as claimed in claim 13, wherein:
said fiber optic means include an optical fiber having a wavelength-dependent numerical aperture; and
said range finder includes means for providing said light transmitted from said object with different wavelengths to provide said optical fiber with different first and second numerical apertures, for transmission of said light at said different wavelengths from the object with said optical fiber for a given range at a predetermined ratio corresponding to a difference between said first and second numerical apertures, and variation of the latter ratio by variations in said range for detection and performance of said range finder operation.

19. A range finder as claimed in claim 13, wherein:
said fiber optic means include an optical fiber having a wavelength-dependent numerical aperture; and
said range finder includes means for varying light from said object in wavelength to provide said optical fiber alternatively with different first and second numerical apertures for transmission of said light at said varying wavelength successively from the object with said optical fiber for a given range at a predetermined ratio corresponding to a difference between said first and second numerical apertures, for variation of the latter ratio in response to variations in said range for detection and performance of said range finder operation.

20. A range finder as claimed in claim 13, wherein:
said fiber optic means include a mechanically compressible optical fiber having alternating optical modes in response to successive compression and relaxation of the optical fiber; and
said range finder includes means for alternatively compressing and relaxing said optical fiber to provide said optical fiber with a response corresponding to that of alternating different first and second numerical apertures and means for transmitting said light from the object through said alternatively compressed and relaxed optical fiber to provide for a given range a predetermined ratio of light transmission corresponding to a difference between said first and second numerical apertures, and for variation of the latter ratio in response to variations in said range for detection and performance of said range finder operation.

21. A range finder as claimed in claim 13, wherein:
said fiber optic means include an optical fiber having a light output end and operating at high order modes and low order modes and an optical filter for attenuating in light transmitted by said optical fiber predetermined order modes more than the other ones of said order modes; and
said fiber optic means including at said light output end a first light path including said filter for attenuating said predetermined order modes and a second light path excluding said filter for providing said fibers optic means in said optical fiber and first and second lightpaths with a response corresponding to that of alternating different first and second numerical apertures, respectively, for transmission of said light from the object through said optical fiber and through said first and second light paths for a given range at a predetermined ratio of light transmission corresponding to a difference between the latter first and second numerical apertures, and for variation of the latter ratio by variations in said range for detection and performance of said range finder operation.

22. A range finder as claimed in claim 21, wherein:
said fiber optic means include beam dividing means at said light output end for providing said first and second light paths.

23. A range finder as claimed in claim 13, wherein:
said fiber optic means include an optical fiber having a light output end and operating at high order modes and low order modes and an optical filter for light transmitted by said optical fiber attentuating predetermined order modes more than the other ones of said order modes; and
said fiber optic means including means for moving said optical filter at said light output end intermittently in and alternatively out of a path of light from said object transmitted by said optical fiber to provide said fiber optic means with a response corresponding to that of alternating different first and second numerical apertures, for transmission of said light from the object through said optical fiber and intermittently through said optical filter in addition to said optical fiber for a given range at a predetermined ratio of light transmission corresponding to a difference between the latter first and second numerical apertures, and for variation of the latter ratio by variations in said range for detection and performance of said range finder operation.

24. A range finder as claimed in claim 13, wherein:
said fiber optic means include an optical fiber having a core and a cladding either of which has a variable refractive index; and
said fiber optic means including means for varying said refractive index to provide said optical fiber with a response corresponding to that of alternating different first and second numerical apertures, for transmission of said light from the object through said optical fiber while varying said refractive index to provide for a given range a predetermined ratio of light transmission corresponding to a difference between said first and second numerical apertures, and for variation of the latter ratio by variations in said range for detection and performance of said range finder operation.

* * * * *